United States Patent
Bhargava et al.

(10) Patent No.: US 12,351,936 B2
(45) Date of Patent: Jul. 8, 2025

(54) LAYERED PLATING STACK FOR IMPROVED CONTACT RESISTANCE IN CORROSIVE ENVIRONMENTS

(71) Applicant: TE Connectivity Solutions GmbH, Schaffhausen (CH)

(72) Inventors: Suvrat Bhargava, Baltimore, MD (US); Matthew Little, Harrisburg, PA (US); Martin William Bayes, Hopkinton, MA (US); Rodney Ivan Martens, Singapore (SG); Bradley M. Schultz, Mechanicsburg, PA (US)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 0 days.

(21) Appl. No.: 18/314,279

(22) Filed: May 9, 2023

(65) Prior Publication Data
US 2023/0374688 A1    Nov. 23, 2023

Related U.S. Application Data

(60) Provisional application No. 63/343,677, filed on May 19, 2022.

(51) Int. Cl.
| | |
|---|---|
| *B32B 15/01* | (2006.01) |
| *C25D 3/12* | (2006.01) |
| *C25D 3/46* | (2006.01) |
| *C25D 3/48* | (2006.01) |

(Continued)

(52) U.S. Cl.
CPC .............. *C25D 5/12* (2013.01); *B32B 15/01* (2013.01); *C25D 3/12* (2013.01); *C25D 3/46* (2013.01); *C25D 3/48* (2013.01); *C25D 3/50* (2013.01); *Y10T 428/12861* (2015.01)

(58) Field of Classification Search
CPC .. B32B 15/01; B32B 2250/04; B32B 2250/05
See application file for complete search history.

(56) References Cited

U.S. PATENT DOCUMENTS

| | | |
|---|---|---|
| 2,897,584 A | 8/1959 | Karl |
| 5,139,890 A | 8/1992 | Cowie et al. |

(Continued)

FOREIGN PATENT DOCUMENTS

WO    2004064154 A1    7/2004

*Primary Examiner* — Adam Krupicka

(57) ABSTRACT

A layered plating stack which includes an underlying plating layer formed on a substrate; an intermediate plating layer; an outer plating layer; and at least one strike layer of noble metal. The noble metal of the strike layer is a different metal than the metal of the intermediate plating layer. The layered plating stack with the strike layer maintains contact resistance of below 25 mohms when tested under a load of at least approximately 30 grams after 1 or more days of exposure to a gaseous environment which includes $Cl_2$, $NO_2$ and $SO_2$. The layered plating stack with the strike layer also maintains a contact resistance of below 25 mohms when tested under a load of at least approximately 30 grams with a wipe of at least approximately 0.1 mm after exposure to a gaseous environment which includes one or more of $H_2S$, $Cl_2$, $NO_2$ and $SO_2$.

12 Claims, 5 Drawing Sheets

(51) Int. Cl.
*C25D 3/50* (2006.01)
*C25D 5/12* (2006.01)

(56) References Cited

U.S. PATENT DOCUMENTS

| | | | |
|---|---|---|---|
| 8,541,871 B2 * | 9/2013 | Tomohiro | H10H 20/857 |
| | | | 257/677 |
| 9,797,056 B2 | 10/2017 | Weyhmueller et al. | |
| 2002/0104682 A1 | 8/2002 | Park et al. | |
| 2007/0090501 A1 * | 4/2007 | Oida | H01L 23/49582 |
| | | | 257/E23.054 |

* cited by examiner

LAYERED PLATING STACK FOR IMPROVED CONTACT RESISTANCE IN CORROSIVE ENVIRONMENTS

CROSS REFERENCE TO RELATED APPLICATIONS

This application claims priority to U.S. Provisional Patent Application Ser. No. 63/343,677 filed on May 19, 2022 which is incorporated herein by reference in its entirety.

FIELD OF THE INVENTION

The present invention relates to a layered plating stack for improved contact resistance in corrosive environments. In particular, the invention relates to including a strike layer of a noble metal, such as palladium, to improve low-level contact resistance after exposure to a corrosive environment.

BACKGROUND OF THE INVENTION

Strike layers are known to be used between two layer of material. The strike layers often form a very thin (typically less than 0.5 micrometer thick) layer with high quality and good adherence to adjacent layers of the different metals. If it is desirable to plate a material having desired characteristics or properties to another a base material or another plated material, but the material with the desired characteristics has inherently poor adhesion to the base material or the other plated material, a strike layer can be deposited between the layers that is compatible with both the material having desired characteristics or properties and the plated base material. An example of this situation is the poor adhesion of electrolytic silver palladium material when directly applied on nickel material, in which case a strike (for example, a silver strike) may be used, which has good adherence to both.

In corrosive environments, when the final plated article is exposed to a corrosive environment it is not usual to see an influence of a strike layer that is buried beneath a functional layer. To see any observed influence of the strike layer on the corrosion performance of the final plated article is not expected.

It would therefore be beneficial to provide a strike layer made of material which enhances the contact resistance of the final article when it is exposed to a corrosive environment.

SUMMARY OF THE INVENTION

An object of the invention is to provide a strike layer which is used between layers of plated material which enhances contact resistance when exposed to a corrosive environment.

An object is to provide a layered plating stack with at least one noble metal strike layer which withstands corrosion testing better than a plated stack with a silver strike layer. The noble metal may be, but is not limited to, palladium. Low level contact resistance is maintained at significantly lower levels for the layered plating stack with the noble metal strike layer than with the layered plating stack with the silver strike layer. The results of the layered plating stack with the noble metal strike layer were consistently better than the results of the layered plating stack with the silver strike layer over periods of exposure to corrosive environments and over different normal loads and wipe distances.

An embodiment is directed to a layered plating stack which includes an underlying plating layer formed on a substrate; an intermediate plating layer; an outer plating layer; and at least one strike layer of noble metal. The noble metal of the strike layer is a different metal than the metal of the intermediate plating layer. The layered plating stack maintains contact resistance of below approximately 25 mohms when tested under a load of at least approximately 30 grams after 1 or more days of exposure to a gaseous environment which includes one or more of $H_2S$, $Cl_2$, $NO_2$ and $SO_2$.

An embodiment is directed to a layered plating stack which includes an underlying plating layer formed on a substrate; an intermediate plating layer; an outer plating layer; and at least one strike layer of noble metal. The noble metal of the strike layer is a different metal than the metal of the intermediate plating layer. The layered plating stack maintains a contact resistance of below approximately 25 mohms when tested, after exposure to a gaseous environment which includes one or more of $H_2S$, $Cl_2$, $NO_2$ and $SO_2$, with a wipe of at least approximately 0.1 mm under a load of at least approximately 30 grams.

The environment may have a temperature maintained at 30±2 degrees Celsius with a relative humidity of 70%±2 and the layered plating stack is exposed to 10+0/−4 ppb $H_2S$, 10+0/−2 ppb $Cl_2$, 200±25 ppb $NO_2$ and 100±25 ppb $SO_2$.

Other features and advantages of the present invention will be apparent from the following more detailed description of the illustrative embodiment, taken in conjunction with the accompanying drawings which illustrate, by way of example, the principles of the invention.

BRIEF DESCRIPTION OF THE DRAWINGS

FIG. 5 is an illustration of corrosion on the layered plating stack over time, after exposure to the corrosive gaseous environment for 0 days, 2 days and 5 days, the layered plating stack having an outer layer of gold, an intermediate plating layer of silver palladium and an underlying plating layer of nickel with a palladium strike layer between.

DETAILED DESCRIPTION OF THE INVENTION

Figure 1:
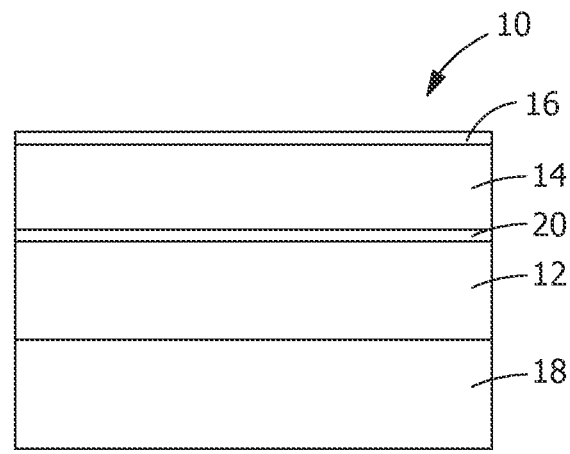
FIG. 1 is a diagrammatic cross-sectional view of a first embodiment of illustrative layers of a plated material with an illustrative strike layer provided between respective layers.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Referring to FIG. 1, a first exemplary layered plating stack 10 has a first or underlying plating layer 12, a second or intermediate plating layer 14 and a third or outer plating layer 16. The first or underlying plating layer 12 of the layered plating stack is formed on a substrate 18, such as, but not limited to a metal layer.

In the illustrative embodiment, the underlying plating layer 12 is made of nickel (Ni) or nickel alloy. In the illustrative embodiment, the thickness of the underlying plating layer 12 is about 0.5 µm to about 5.0 µm. However, other materials and thickness of the underlying plating layer 12 may be used.

The intermediate plating layer 14 is made of a silver or silver alloy, such as, but not limited to silver palladium (AgPd). In the illustrative embodiment, the thickness of the intermediate plating layer 14 is about 0.5 µm to about 5.0 µm. However, other material and thickness of the intermediate plating layer 14 may be used.

The outer plating layer 16 is made of gold (Au) or gold alloy. In the illustrative embodiment, the thickness of the outer plating layer 16 is about 0.1 µm to about 0.3 µm. However, other materials and thickness of the outer plating layer 16 may be used.

In the embodiment shown in FIG. 1, a plated strike or flash layer 20 is applied between the underlying plating layer 12 and the intermediate plating layer 14. In the illustrative embodiment, the intermediate plating layer 14 is made of silver palladium and the strike or flash layer 20 is made of palladium (Pd), although other types of noble metals, such as, but not limited to rhenium, ruthenium, rhodium, osmium, iridium, platinum and gold may be used. The strike or flash layer 20 is made from a material which is different than the material of the plating layer 12 or the intermediate plating layer 14. In the illustrative embodiment the strike or flash layer 20 has a minimum thickness of about 0.01 µm. In various illustrative embodiments, the thickness of the strike layer 20 is below about 1.0 µm, below about 0.5 µm, below about 0.2 µm.

The strike or flash layer 20 provides proper bonding between the underlying plating layer 12 and the intermediate plating layer 14. The strike or flash layer 20 may also minimize diffusion between the underlying plating layer 12 and the intermediate plating layer 14. In addition, as discussed above, the layered plating stack with the palladium strike layer 20 provides improved low-level contact resistance when exposed to corrosive gaseous environments.

The layered plating stack 10 with the strike or flash layer 20, may be tested according to relevant test conditions, such as, but not limited to, corrosive mixed flowing gas environmental exposure in which the layered plating stack 10 is exposed to various combinations of one or more of $H_2S$, $Cl_2$, $NO_2$ and $SO_2$. For example, the layered plating stack 10 with the strike or flash layer 20, as shown in FIG. 1, was tested according to EIA, EIA-364 TP-65B Mixed Flowing Gas Test Procedure for Electrical Connectors, Contacts and Sockets, using a Class IIA Mixed Flowing Gas Testing environment in which the temperature is maintained at 30±2 degrees Celsius with a relative humidity of 70%±2 and the layered plating stack 10 is exposed to 0+0/−4 ppb $H_2S$, 10 +0/−2 ppb $Cl_2$, 200±25 ppb $NO_2$ and 100±25 ppb $SO_2$. The appearance of the samples and the low level contact resistance performance were recorded after exposures of 0 days, 2 day and 5 days. The results are illustrated pictorially in FIG. 5 and graphically in FIG. 6.

Figure 5:
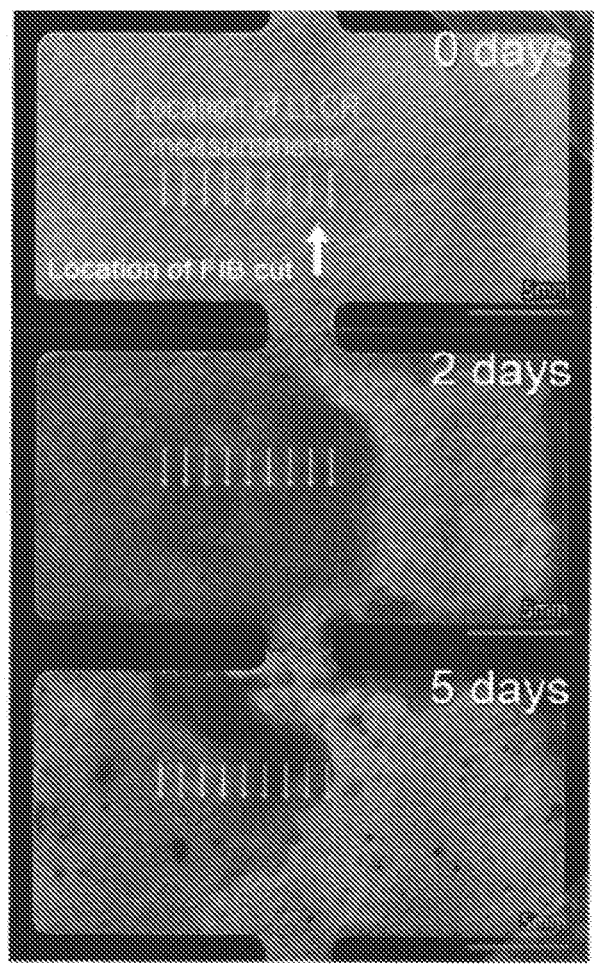

FIG. 5 shows the results of a gold flashed/1.4 µm silver palladium/nickel stack with a palladium strike layer. The results are shown after test exposures of 0 days, 2 days and 5 days.

Figure 6:
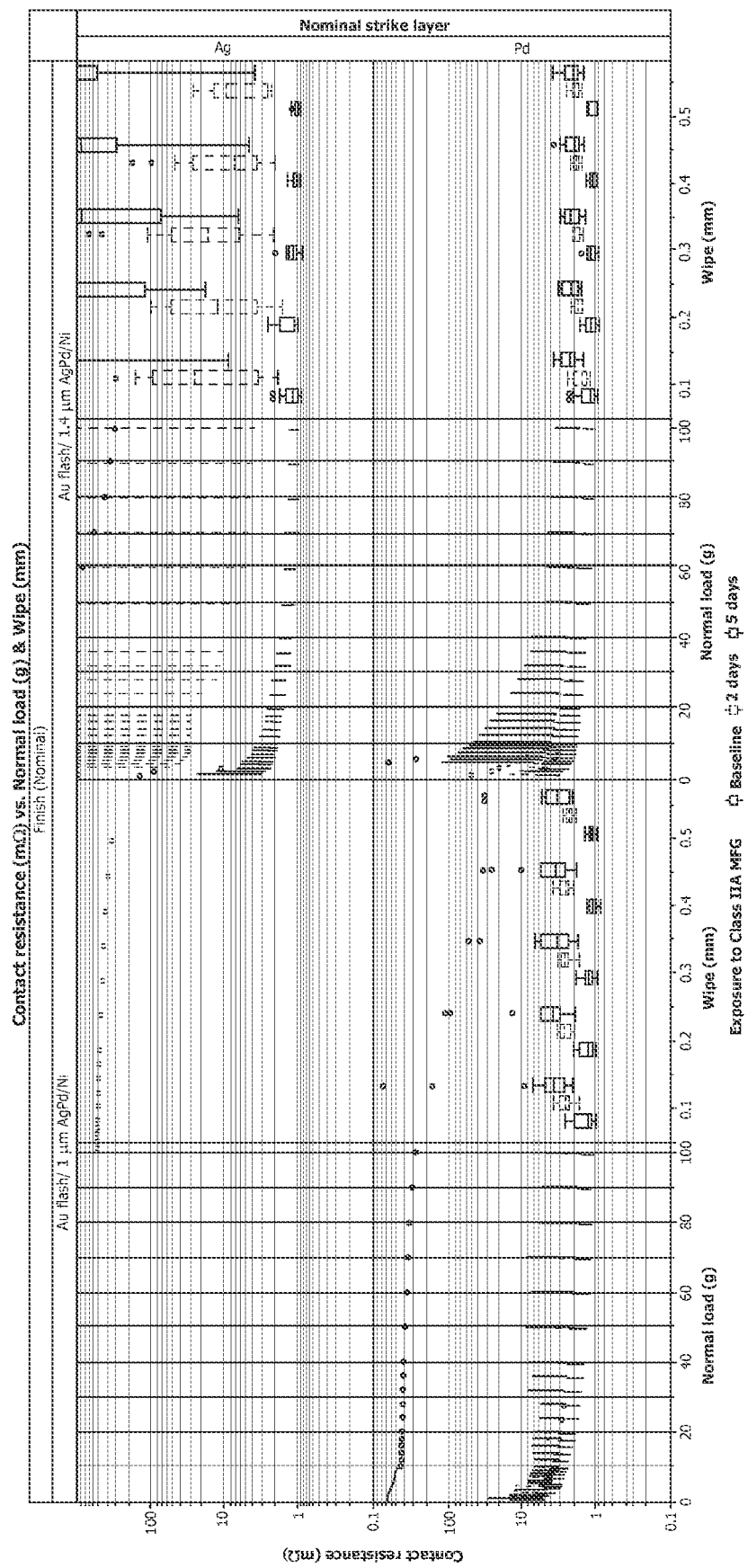
FIG. 6 is a graph illustrating the contact resistance versus normal load and the contact resistance versus wipe of the layered plating stack of FIG. 5.

As shown in FIG. 6, the layered plating stack with the strike layer 20 maintained contact resistance of below approximately 25 mohms, and often below approximately 10 mohms, when tested under a load of at least approximately 30 grams after 1 or more days of exposure to an environment in which the temperature is maintained at 30±2 degrees Celsius with a relative humidity of 70%±2 and the layered plating stack 10 is exposed to 10+0/−4 ppb $H_2S$, 10+0/−2 ppb $Cl_2$, 200±25 ppb $NO_2$ and 100±25 ppb $SO_2$.

As shown in FIG. 6, the layered plating stack 10 with the strike layer 20 maintained contact resistance of below approximately 25 mohms, and often below approximately 10 mohms, when tested under a load of at least approximately 30 grams with a wipe of approximately 0.1 mm or greater after exposure to an environment in which the temperature is maintained at 30±2 degrees Celsius with a relative humidity of 70%±2 and the layered plating stack 10 is exposed to 10+0/−4 ppb $H_2S$, 10+0/−2 ppb $Cl_2$, 200±25 ppb $NO_2$ and 100±25 ppb $SO_2$. Wipe refers to the sliding or tangential motion between the top surface of the layered plating stack 10 and a surface of a mating contact when the mating contact is moved into engagement with the layered plating stack 10. The wiping motion allows oxides and other contaminants present on the surfaces to be removed.

As is shown in FIG. 6, the layered plating stack with the palladium strike layer 20 withstood the corrosion testing better than a plated stack with a silver strike layer. As shown in FIG. 6, low level contact resistance was maintained at significantly lower levels for the layered plating stack with the palladium strike layer than with the layered plating stack with the silver strike layer. The results of the layered plating stack with the palladium strike layer were consistently better than the results of the layered plating stack with the silver strike layer over time and over different normal loads and wipe distances.

In another illustrative embodiment, the underlying plating layer 12 is made of nickel, the intermediate plating layer 14 is made of silver and the outer plating layer is made of gold. The strike or flash layer 20 is applied between the underlying plating layer 12 and the intermediate plating layer 14. In this illustrative embodiment, the strike or flash layer 20 is made of palladium (Pd). In the illustrative embodiment the strike or flash layer 20 has a minimum thickness of about 0.01 µm. In various illustrative embodiments, the thickness of the strike or flash layer 20 is below about 1.0 µm, below about 0.5 µm, below about 0.2 µm.

As previously stated, the layered plating stack 10 with the strike or flash layer 20, may be tested according to relevant test conditions, such as, but not limited to, corrosive mixed flowing gas environmental exposure in which the layered plating stack 10 is exposed to various combinations of one or more of $H_2S$, $Cl_2$, $NO_2$ and $SO_2$. For example, the layered plating stack 10 with the silver intermediate plating layer 14 and palladium strike or flash layer 20 was tested according to EIA, EIA-364 TP-65B Mixed Flowing Gas Test Procedure for Electrical Connectors, Contacts and Sockets, using a Class IIA Mixed Flowing Gas Testing environment in which the temperature is maintained at 30±2 degrees Celsius with a relative humidity of 70%±2 and the layered plating stack 10 is exposed to 10+0/−4 ppb $H_2S$, 10+0/−2 ppb $Cl_2$, 200±25 ppb $NO_2$ and 100±25 ppb $SO_2$. The appearance of the samples and the low level contact resistance performance were recorded after exposures of 0 days, 2 day and 5 days.

Figure 7:
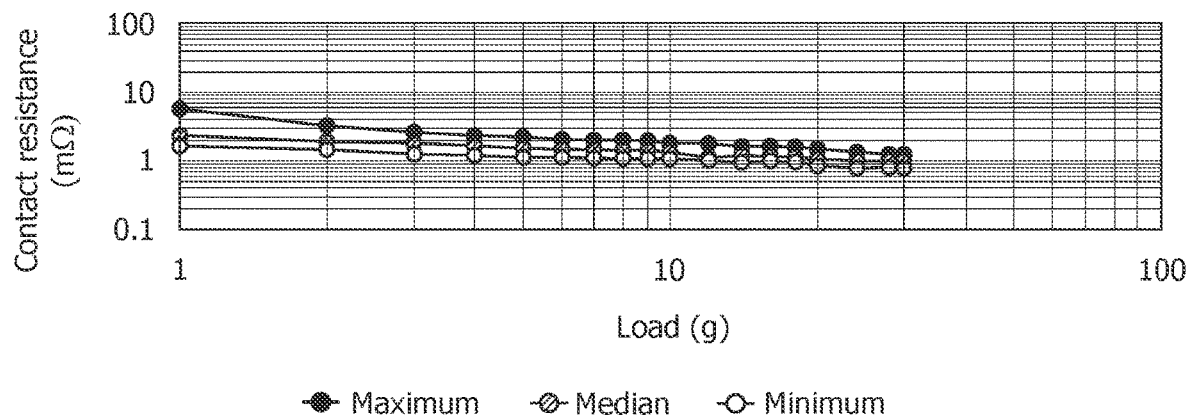
FIG. 7 is a graph illustrating the contact resistance versus normal load of a layer plating stack having an outer layer of gold, an intermediate plating layer of silver and an underlying plating layer of nickel with a palladium strike layer between FIG. 8 is a graph illustrating the contact resistance versus wipe of the layered plating stack of FIG. 7.
Figure 8:
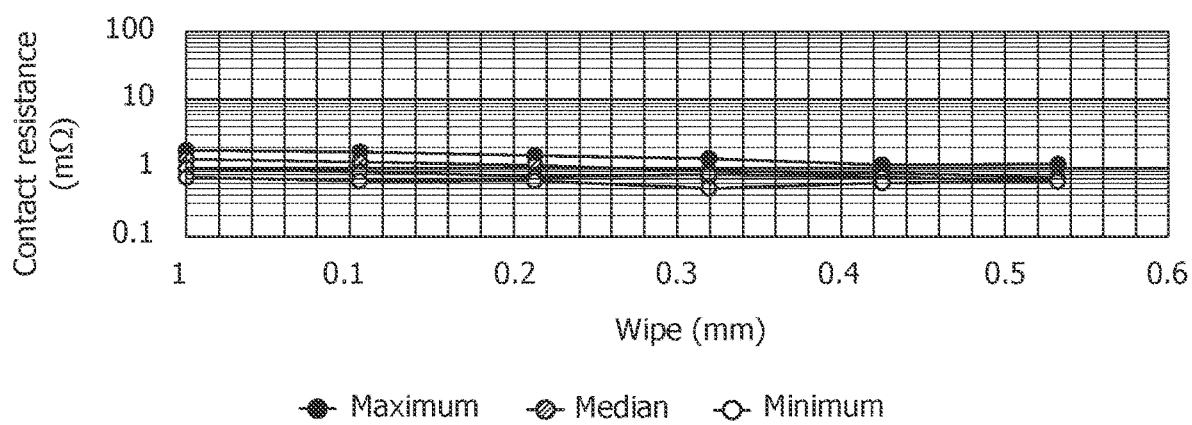
Figure 9:
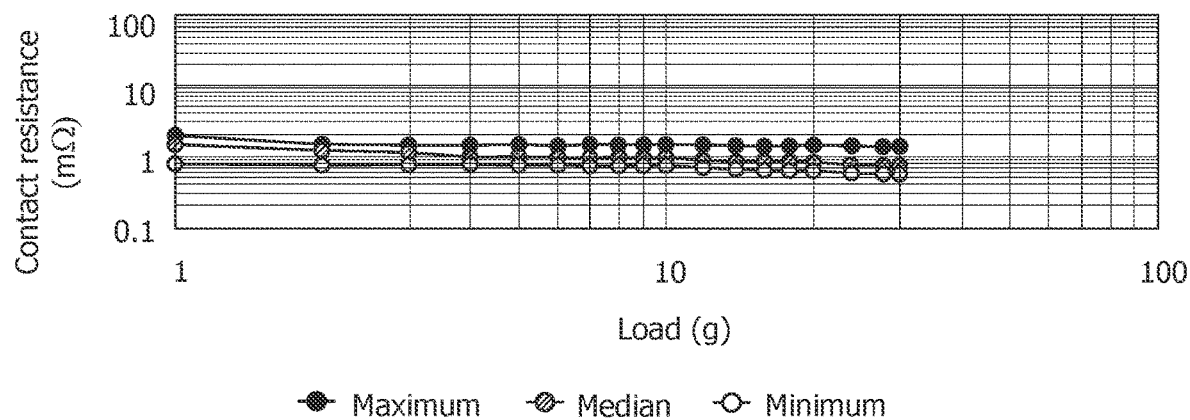
FIG. 9 is a graph illustrating the contact resistance versus normal load of a layer plating stack having an outer layer of gold, an intermediate plating layer of silver and an underlying plating layer of nickel with a palladium strike layer between FIG. 10 is a graph illustrating the contact resistance versus wipe of the layered plating stack of FIG. 9.
Figure 10:
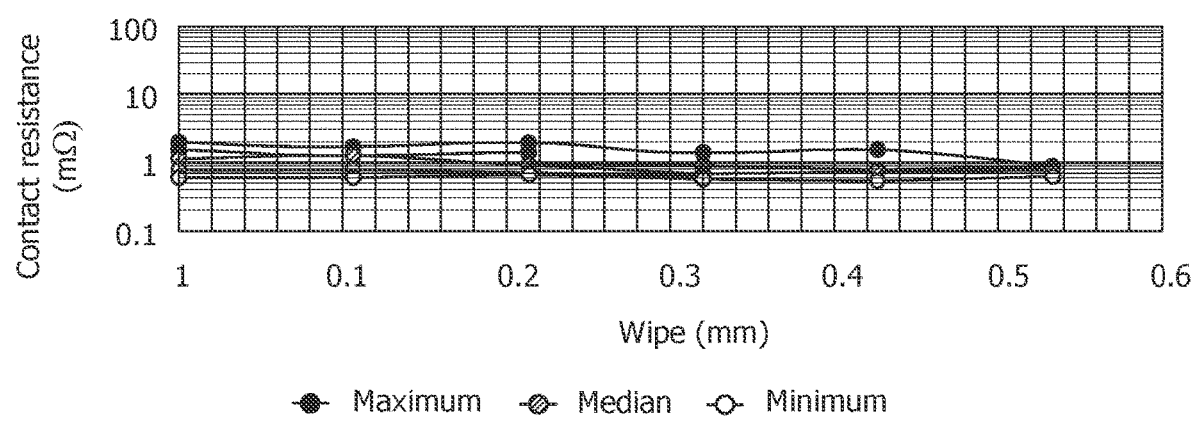

As shown in FIGS. 7 and 8, in which the palladium strike or flash layer 20 is approximately 1.5 µm, and FIGS. 9 and 10, in which the palladium strike or flash layer 20 is approximately 4.5 µm, the layered plating stack described in the preceding paragraph maintained contact resistance of below approximately 25 mohms, and often below approximately 10 mohms, when tested under a load of at least approximately 30 grams after 1 or more days of exposure to an environment in which the temperature is maintained at 30±2 degrees Celsius with a relative humidity of 70%±2 and the layered plating stack 10 is exposed to 10+0/−4 ppb $H_2S$, 10+0/−2 ppb $Cl_2$, 200±25 ppb $NO_2$ and 100±25 ppb $SO_2$. In addition, the layered plating stack 10 with the strike layer 20 maintained contact resistance of below approximately 25 mohms, and below approximately 10 mohms, when tested under a load of at least approximately 30 grams with a wipe of approximately 0.1 mm or greater after exposure to an environment in which the temperature is maintained at 30±2 degrees Celsius with a relative humidity of 70%±2 and the layered plating stack 10 is exposed to 10+0/−4 ppb $H_2S$, 10+0/−2 ppb $Cl_2$, 200±25 ppb $NO_2$ and 100±25 ppb $SO_2$. Wipe refers to the sliding or tangential motion between the top surface of the layered plating stack 10 and a surface of a mating contact when the mating contact is moved into engagement with the layered plating stack 10. The wiping motion allows oxides and other contaminants present on the surfaces to be removed.

The layered plating stacks described above and graphed in FIGS. 7 through 10 with the palladium strike or flash layer 20 withstood the corrosion testing better than a plated stack with a silver strike layer. The results of the layered plating stack with the palladium strike layer were consistently better than the results of the layered plating stack with the silver strike layer over time and over different normal loads and wipe distances.

Figure 2:
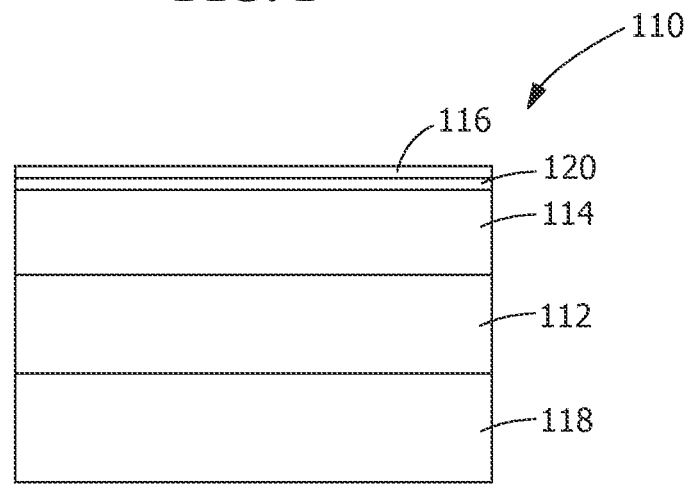
FIG. 2 is a diagrammatic representation of a second embodiment of illustrative layers of a plated material with an illustrative strike layer provided between respective layers.

Referring to FIG. 2, a second first exemplary layered plating stack 110 has a first or underlying plating layer 112, a second or intermediate plating layer 114 and a third or outer plating layer 116. The first or underlying plating layer 112 of the layered plating stack is formed on a substrate 118, such as, but not limited to a metal layer.

In the illustrative embodiment, the underlying plating layer 112 is made of nickel (Ni) or nickel alloy. In the illustrative embodiment, the thickness of the underlying plating layer 112 is about 0.5 µm to about 1.25 µm. However, other material and thickness of the underlying plating layer 112 may be used.

The intermediate plating layer 114 is made of silver palladium (AgPd). In the illustrative embodiment, the thickness of the intermediate plating layer 114 is about 0.7 µm to about 1.0 µm. However, other material and thickness of the intermediate plating layer 114 may be used.

The outer plating layer 116 is made of gold (Au) or gold alloy. In the illustrative embodiment, the thickness of the outer plating layer 116 is about 0.1 µm to about 0.3 µm. However, other material and thickness of the outer plating layer 116 may be used.

In the embodiment shown in FIG. 2, a plated strike layer 120 is applied between the intermediate plating layer 114 and the outer layer 116. In the illustrative embodiment, the strike layer 120 is made of palladium (Pd), although other types of noble metals may be used. In the illustrative embodiment the strike layer 120 has a minimum thickness of 0.01 µm. In various illustrative embodiments, the thickness of the strike layer 120 is below about 1.0 µm, below about 0.5 µm, below about 0.2 µm.

The strike layer 120 provides proper bonding between the intermediate plating layer 114 and the outer layer 116. The strike layer 120 may also minimize diffusion between the intermediate plating layer 114 and the outer layer 116. In addition, as discussed above, the layered plating stack with the palladium strike layer 120 provides improved low-level contact resistance when exposed to corrosive gaseous environments.

Figure 3:
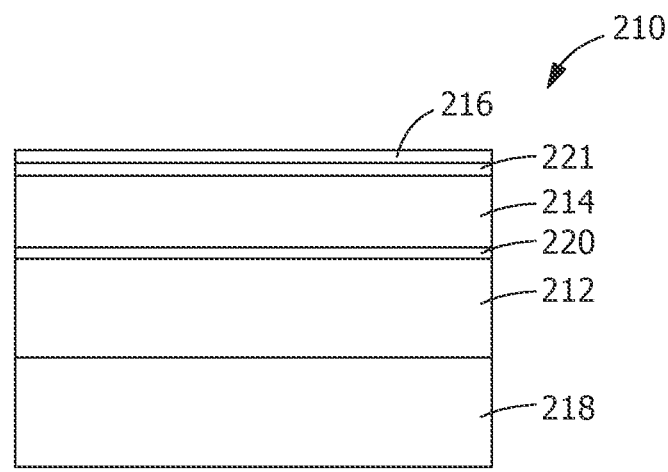
FIG. 3 is a diagrammatic representation of a third embodiment of illustrative layers of a plated material with two illustrative strike layers provided between respective layers.

Referring to FIG. 3, a third exemplary layered plating stack 210 has a first or underlying plating layer 212, a second or intermediate plating layer 214 and a third or outer plating layer 216. The first or underlying plating layer 212 of the layered plating stack is formed on a substrate 218, such as, but not limited to a metal layer.

In the illustrative embodiment, the underlying plating layer 212 is made of nickel (Ni) or nickel alloy. In the illustrative embodiment, the thickness of the underlying plating layer 212 is about 0.5 µm to about 1.25 µm. However, other material and thickness of the underlying plating layer 212 may be used.

The intermediate plating layer 214 is made of silver palladium (AgPd). In the illustrative embodiment, the thickness of the intermediate plating layer 214 is about 0.7 µm to about 1.0 µm. However, other material and thickness of the intermediate plating layer 214 may be used.

The outer plating layer 216 is made of gold (Au) or gold alloy. In the illustrative embodiment, the thickness of the outer plating layer 216 is about 0.1 µm to about 0.3 µm. However, other material and thickness of the outer plating layer 216 may be used.

In the embodiment shown in FIG. 3, a first plated strike layer 220 is applied between the underlying plating layer 212 and the intermediate plating layer 214 and a second plated strike layer 221 is applied between the intermediate plating layer 214 and the outer layer 216. In the illustrative embodiment, the strike layers 220, 221 are made of palladium (Pd), although other types of noble metals may be used. In the illustrative embodiment the strike layers 220, 221 have a minimum thickness of 0.01 μm. In various illustrative embodiments, the thickness of the strike layers 220, 221 is below about 1.0 μm, below about 0.5 μm, below about 0.2 μm.

The strike layers 220, 221 are provided to provide proper bonding between the underlying plating layer 212 and the intermediate plating layer 214 and the intermediate plating layer 214 and the outer layer 216. The strike layers 220, 221 may also minimize diffusion between the underlying plating layer 212 and the intermediate plating layer 214 and the intermediate plating layer 214 and the outer layer 216. In addition, as discussed above, the layered plating stack with the palladium strike layers 220, 221 provide improved low-level contact resistance after exposure to corrosive gaseous environments.

Figure 4:
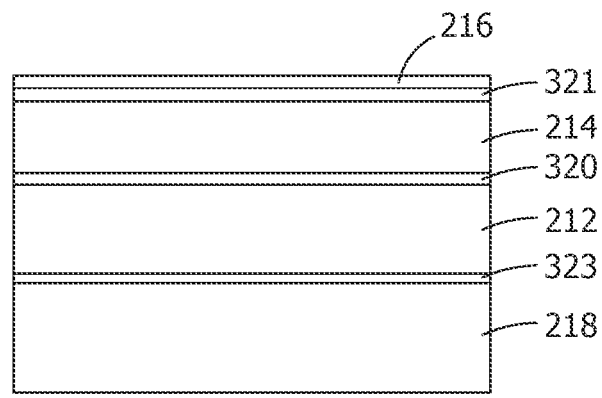
FIG. 4 is a diagrammatic representation of a fourth embodiment of illustrative layers of a plated material with three illustrative strike layers provided between respective layers.

The embodiment shown in FIG. 4 is similar to the embodiment shown in FIG. 3, with the exception that an additional plate strike layer 323 is provided. A first plated strike layer 320 is applied between the underlying plating layer 212 and the intermediate plating layer 214; a second plated strike layer 321 is applied between the intermediate plating layer 214 and the outer layer 216; and the third strike layer 323 is applied between the underlying plating layer 212 and the substrate 218.

In the illustrative embodiment, the strike layers 320, 321, 323 are made of palladium (Pd), although other types of noble metals may be used. In the illustrative embodiment the strike layers 320, 321, 323 have a minimum thickness of 0.01 μm. In various illustrative embodiments, the thickness of the strike layers 320, 321, 323 is below about 1.0 μm, below about 0.5 μm, below about 0.2 μm.

The strike layers 320, 321, 323 are provided to provide proper bonding between the underlying plating layer 212 and the intermediate plating layer 214, between the intermediate plating layer 214 and the outer layer 216 and between the underlying plating layer 212 and the substrate 218. The strike layers 320, 321, 323 may also minimize diffusion between the underlying plating layer 212 and the intermediate plating layer 214, between the intermediate plating layer 214 and the outer layer 216 and between the underlying plating layer 212 and the substrate 218. In addition, as discussed above, the plated stack with the palladium strike layers 320, 321, 323 provide improved low-level contact resistance after exposure to corrosive gaseous environments.

If the thickness of the strike layer 20, 120, 220, 221, 320, 321, 323 is less than about 0.01 μm, the strike layer 20, 120, 220, 221, 320, 321, 323 cannot sufficiently cover the underlying plating layer 12, 212, the intermediate layer 114, 214 or the substrate 218. On the other hand, if the thickness of the strike layer 20, 120, 220, 221, 320, 321, 323 is greater than about 1.0 μm, the quality improving effect resulting from an increase of the thickness, is negligible, only increasing the product cost.

While the invention has been described with reference to a preferred embodiment, it will be understood by those skilled in the art that various changes may be made, and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A layered plating stack comprising:
an underlying plating layer formed on a substrate;
an intermediate plating layer;
an outer plating layer; and
at least one strike layer of noble metal, the noble metal of the strike layer being a different metal than a metal of the intermediate plating layer;
wherein the layered plating stack maintains contact resistance of below 25 mohms when tested under a load of at least approximately 30 grams after 1 or more days of exposure to a gaseous environment which includes one or more of $H_2S$, $Cl_2$, $NO_2$ and $SO_2$;
wherein the at least one strike layer includes a first strike layer applied between the underlying plating layer and the intermediate plating layer and a second strike layer applied between the intermediate plating layer and the outer plating layer.

2. The layered plating stack as recited in claim 1, wherein the layered plating stack maintains contact resistance of below 10 mohms when tested under a load of least approximately 30 grams after 1 or more days of exposure to the gaseous environment which includes one or more of $H_2S$, $Cl_2$, $NO_2$ and $SO_2$.

3. The layered plating stack as recited in claim 1, wherein the gaseous environment has a temperature maintained at 30±2 degrees Celsius with a relative humidity of 70%±2 and the layered plating stack is exposed to 10+0/−4 ppb $H_2S$, 10+0/−2 ppb $Cl_2$, 200 ±25 ppb $NO_2$ and 100±25 ppb $SO_2$.

4. The layered plating stack as recited in claim 1, wherein the at least one strike layer has a thickness of less than about 1.0 μm.

5. The layered plating stack as recited in claim 1, wherein the noble metal is palladium.

6. The layered plating stack as recited in claim 1, wherein the underlying plating layer comprises nickel or nickel alloy.

7. The layered plating stack as recited in claim 6, wherein the thickness of the underlying plating layer is about 0.5 μm to about 5.0 μm.

8. The layered plating stack as recited in claim 1, wherein the intermediate plating layer comprises silver palladium.

9. The layered plating stack as recited in claim 1, wherein the intermediate plating layer comprises silver.

10. The layered plating stack as recited in claim 1, wherein the outer plating layer comprises gold.

11. The layered plating stack as recited in claim 1, wherein the thickness of the intermediate plating layer is about 0.5 μm to about 5.0 μm.

12. A layered plating stack comprising:
an underlying plating layer formed on a substrate;
an intermediate plating layer;
an outer plating layer; and
at least one strike layer of noble metal, the noble metal of the strike layer being a different metal than a metal of the intermediate plating layer;

wherein the layered plating stack maintains contact resistance of below 25 mohms when tested under a load of at least approximately 30 grams after 1 or more days of exposure to a gaseous environment which includes one or more of $H_2S$, $Cl_2$, $NO_2$ and $SO_2$;

wherein the at least one plated strike layer is applied between the intermediate plating layer and the outer plating layer.

\* \* \* \* \*